(12) United States Patent
Ogata

(10) Patent No.: US 6,174,043 B1
(45) Date of Patent: *Jan. 16, 2001

(54) PRINTING METHOD AND APPARATUS THEREFOR AND PRINTING SYSTEM

(75) Inventor: Nobuhiko Ogata, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/795,729

(22) Filed: Feb. 4, 1997

(30) Foreign Application Priority Data

Feb. 5, 1996 (JP) .................................................. 8-018814

(51) Int. Cl.[7] ............................... B41J 2/145; B41J 2/15; B41J 29/38; B41J 2/05
(52) U.S. Cl. ................................. 347/40; 347/9; 347/60; 347/5
(58) Field of Search ................................ 347/40, 9, 251, 347/57, 60, 10, 11; 395/117, 101, 109; 358/504, 517

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,617,580 | * 10/1986 | Miyakawa | 347/14 |
| 4,723,129 | 2/1988 | Endo et al. | 347/56 |
| 4,740,796 | 4/1988 | Endo et al. | 347/56 |
| 4,943,813 | 7/1990 | Palmer et al. | 347/41 |
| 4,963,882 | 10/1990 | Hickman | 347/41 |
| 4,982,199 | 1/1991 | Dunn | 347/15 |
| 5,294,996 | * 3/1994 | Sobue | 358/298 |
| 5,483,625 | * 1/1996 | Robertson et al. | 395/117 |
| 5,729,259 | * 3/1998 | Gotoh et al. | 347/43 |

FOREIGN PATENT DOCUMENTS

| | | |
|---|---|---|
| 0517543 | 12/1992 | (EP) . |
| 517543 | 12/1992 | (EP) . |
| 0526205 | 2/1993 | (EP) . |
| 526205 | 2/1993 | (EP) . |
| 0532302 | 3/1993 | (EP) . |
| 532302 | 3/1993 | (EP) . |
| 558236 | * 9/1993 | (EP) . |
| 0597714 | 5/1994 | (EP) . |
| 597714 | 5/1994 | (EP) . |
| 0606022 | 7/1994 | (EP) . |
| 606022 | 7/1994 | (EP) . |
| 0645245 | 3/1995 | (EP) . |
| 0645246 | 3/1995 | (EP) . |
| 645246 | 3/1995 | (EP) . |
| 0665105 | 8/1995 | (EP) . |

(List continued on next page.)

Primary Examiner—N. Le
Assistant Examiner—Thinh Nguyen
(74) Attorney, Agent, or Firm—Fitzpatrick, Cella, Harper & Scinto

(57) ABSTRACT

When an image is to be printed by the so-called multi-scanning method where image data corresponding to one band width is printed by a printhead scanning for a plurality of times, masking is performed on the image data in each of the scanning operation, and an image is printed on the basis of the masked image data. In such manner, pixels printed in each scanning form an image corresponding to one-scanning data (one band width of the data). At the time of printing by multi-scanning, a preliminary pulse is added prior to a driving pulse which drives the printhead so that the density of the image printed by multi-scanning is not decreased. In addition to changing such driving condition of the printhead, the density of the image data outputted to the printhead may be changed.

6 Claims, 17 Drawing Sheets

FOREIGN PATENT DOCUMENTS

| | | |
|---|---|---|
| 0665112 | 8/1995 | (EP) . |
| 54-056847 | 5/1979 | (JP) . |
| 59-123670 | 7/1984 | (JP) . |
| 59-138461 | 8/1984 | (JP) . |
| 60-071260 | 4/1985 | (JP) . |
| 403016733 * | 1/1991 | (JP) . |
| 04028553 | 1/1992 | (JP) . |
| 05031919 | 2/1993 | (JP) . |

* cited by examiner

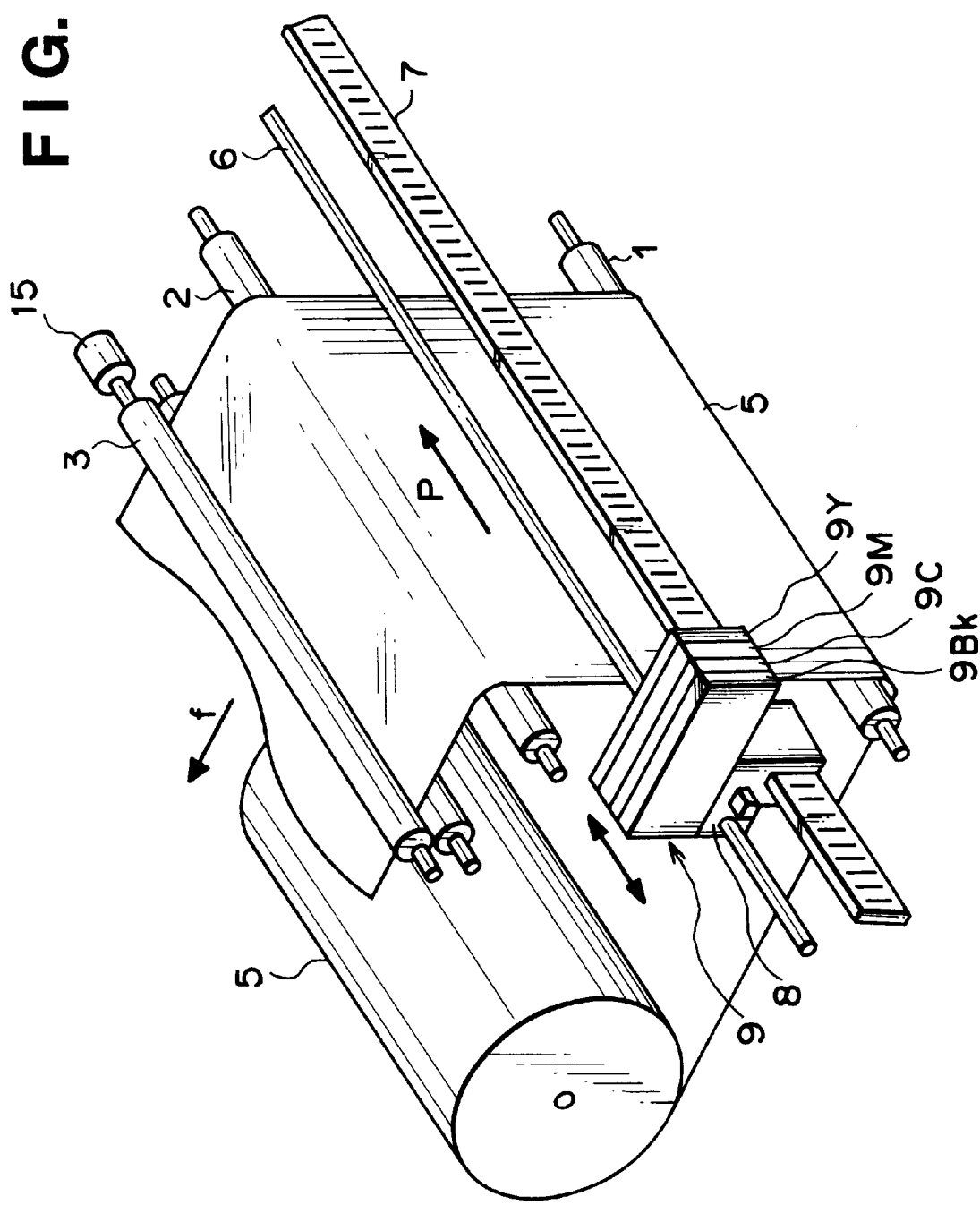

FIG. 4
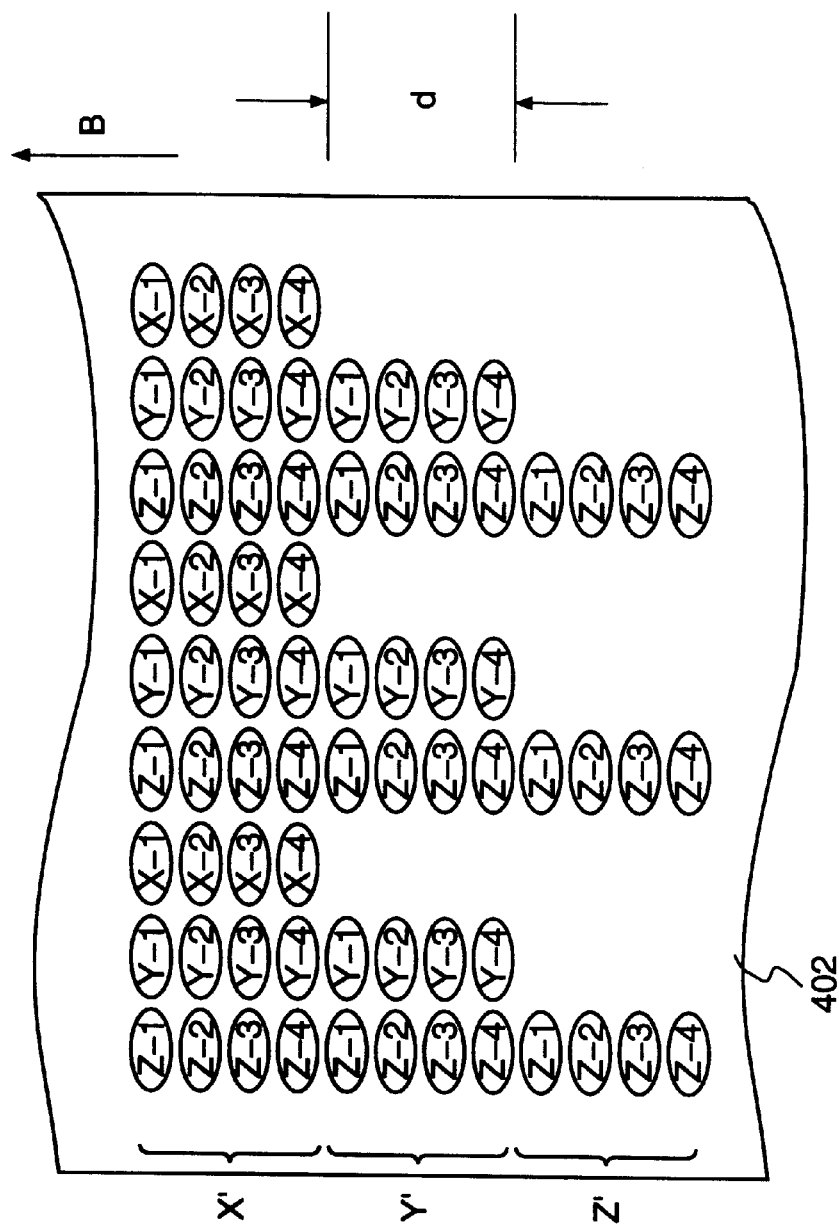
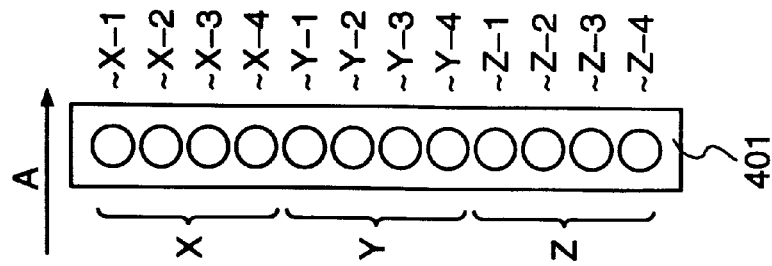

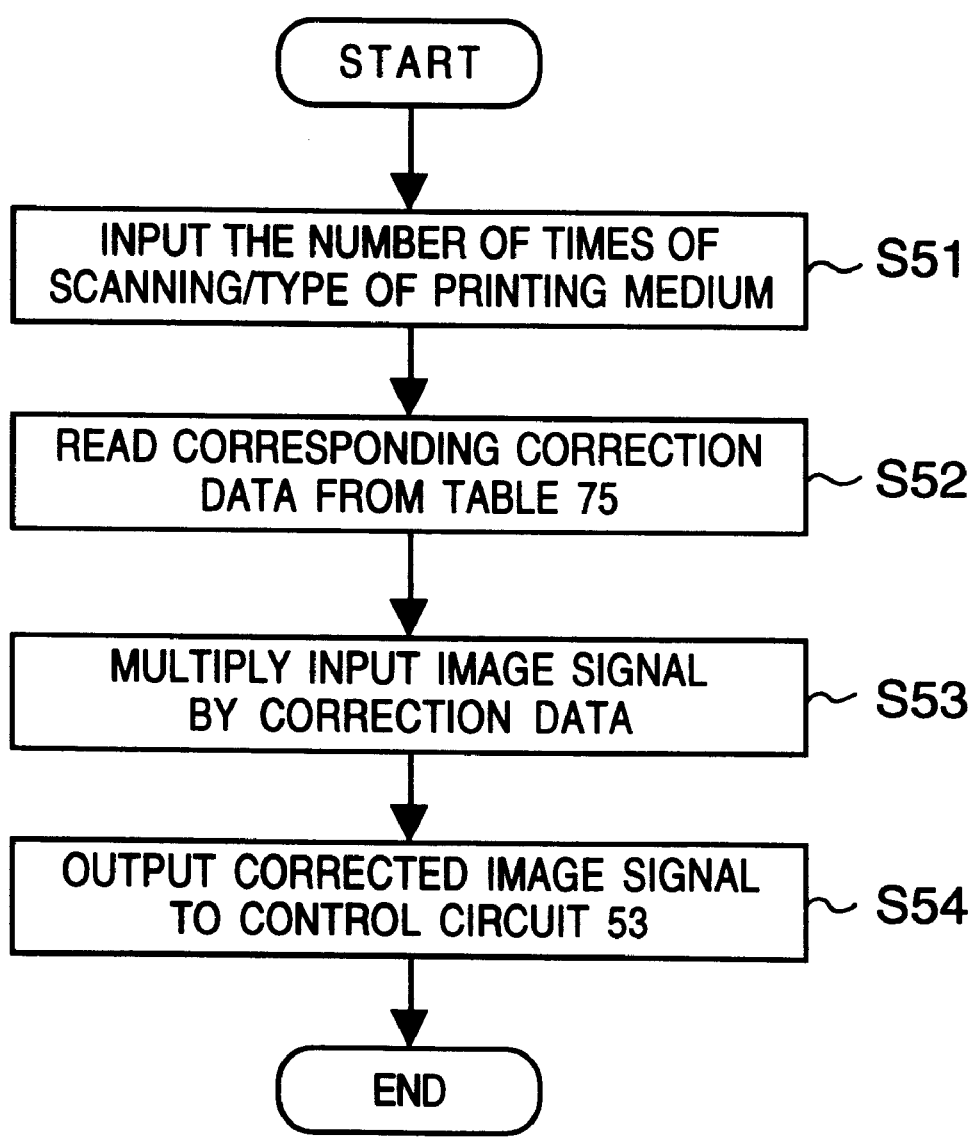

PRINTING METHOD AND APPARATUS THEREFOR AND PRINTING SYSTEM

BACKGROUND OF THE INVENTION

The present invention relates to a printing method and apparatus therefor and a printing system for printing an image on a printing medium by scanning with a printhead.

As a conventional image printing apparatus, an ink-jet printing apparatus (printer device) which performs printing (recording) by discharging ink on a printing medium such as a print sheet or the like is known.

The ink-jet printing apparatus is characterized by low-level noise because of the non-impact type and the capability of full-color image printing using plural colors of ink. In late years, such ink-jet printing apparatus is quickly diffused in the market.

FIG. 2 is a perspective view showing a general arrangement of a conventional ink-jet printing apparatus.

In FIG. 2, a rolled-type printing medium 5 is conveyed via conveying rollers 1 and 2 and held between a set of feeding rollers 3 and sent in a direction indicated by the arrow f in the figure, along with rotation of a sub-scanning motor 15 connected to the feeding roller 3. Guide rails 6 and 7 are arranged in parallel to move a carriage 8 traversingly over the printing medium 5, and along with the movement of the carriage 8, a printhead 9 scans in a lateral direction. The carriage 8 loads heads 9Y, 9M, 9C and 9Bk respectively corresponding to yellow, magenta, cyan and black, each having a plurality of ink discharge orifices. Ink tanks for the four colors of ink are arranged corresponding to the heads.

A printing operation, the printing medium 5 is intermittently conveyed in a unit of a printing width of the printhead 9. While the printing medium 5 is stopped, the printhead 9 scans in the direction of an arrow P, and in synchronization with the scanning process, an ink drop corresponding to a binarized image signal is discharged from each of orifices of each of the heads, performing printing operation.

In such ink-jet printing apparatus, characteristics of a printing medium are important. Particularly, the ink blurring characteristic of a printing medium largely affects image quality. As an index indicating the ink blurring characteristic of a printing medium, "blur rate" is known. The blur rate indicates a magnification of a diameter of an ink drop discharged from an ink-jet nozzle and blurred on a printing medium. The blur rate is obtained by the following equation:

blur rate=(dot diameter on a printing medium)/discharged ink drop diameter).

For instance, assuming that a discharged ink drop having a diameter of 30 $\mu$m forms a dot having a diameter of 90 $\mu$m on a printing medium. The blur rate of the given printing medium is 3.0. In a printing medium having a low blur rate, an image printed by discharging ink drops on the printing medium has a high image density (dark), thus it is difficult to obtain a realistic high-quality image by using the printing medium having a low blur rate.

On the contrary, in a printing medium having a high blur rate, a printed image on the printing medium has a low image density (light), but has the following problem. In the serial scanning type ink-jet printing apparatus as shown in FIG. 2, the printhead 9 having plural ink discharge orifices in parallel scans in a direction of the arrow A as shown in FIGS. 3A and 3B, thereby printing an image having a width d in the sequence of (1), (2) and (3). The width d is determined by the number of ink discharge orifices and the density of orifices of the head 9 (printing density). For instance, in a case of a printhead having 256 discharge orifices and a printing density of 400 dots/inch (dpi), the width is obtained by:

256×25.4/400=16.256 (mm).

In this case, if the discharged ink amount is small, a width of the printed image almost equal to the printing width d is obtained since ink absorption of the printing medium is sufficient. Thus, if the relative position of the printhead 9 is moved on the printing medium in the direction B for the width d and the printhead 9 scans in the direction A, the image connection created by each print scanning operation is not problematic as shown in FIG. 3A.

However, in a high density (dark) portion, that is, a portion where the amount of ink discharged on the printing medium is large, a printing medium having a high blur rate cannot sufficiently absorb the ink, resulting in ink blur in a vertical direction (direction B) and the printed image width is widened to (d+$\Delta$d) (FIG. 3B). At this stage, if the relative position of the printhead 9 is moved in the direction B for the width "d", the printed images are overlapped for the width "$\Delta$d", causing to form a high-density portion (black line) as shown in FIG. 3B. On the other hand, if the relative position of the printhead is moved in the direction B for the width (d+$\Delta$d), a low density (light) portion where the discharged ink amount is low would have a printing width d, thus a white line is formed between the printed images.

The blurred width $\Delta$d of the printed image in a high-density portion, is influenced by the blur rate of a printing medium and the ink amount discharged on the printing medium. The higher the blur rate is, and the larger the discharged ink amount is, the blurred width $\Delta$d becomes large. Therefore, in order to prevent from forming the aforementioned black line, it is necessary to use a printing medium having a low blur rate or reduce an ink amount in printing operation. However, in such case, an image density of an obtained image becomes low; as a result, a realistic high-quality image cannot be obtained.

In order to solve the foregoing problem, a multi-scanning method has been suggested to obviate the black line formed in a printed image. The printing method representing the characteristics of the multi-scanning method will be described with reference to FIG. 4.

Generally, in the multi-scanning method, nozzles of a printhead 401 are divided into three sections X, Y and Z whose ink discharge orifices are referred to as X-1 to X4, Y-1 to Y4 and Z-1 to Z-4 respectively. In the first scanning operation, only the Z section of the nozzles is used to perform printing operation in a portion Z' of a print sheet, thinning out print data to ⅓ of one-scanning data. Then the print sheet 402 is moved in the direction B for the width d, and a portion indicated by Y' is printed by the Y section of the nozzles of the head 401, thinning out print data to ⅓ of one-scanning data, thereby printing the dots thinned out by the previous printing operation in the portion Z'. Moreover, the print sheet 402 is further moved in the direction B for the width d, and a portion indicated by X' is printed by using the X section of the nozzles. Upon printing the portion X', the dots thinned out by the previous printing operation in the portions Y' and Z' are printed. As set forth above, as illustrated in FIG. 4, the printing operation is performed in such manner that the dots printed by the same nozzle are not printed successively in the direction A. Therefore, the multi-scanning method provides an advantage in that a disturbed image formed by irregular discharging of ink drops becomes non-obvious.

However, there is a difference in density and colors of a printed image between the case where the image is formed by the conventional normal singles-canning operation and the case where the image is printed by the above described multi-scanning method. One of the causes is in that, by performing multi-scanning, an ink amount discharged at one time on a printing medium is decreased, resulting in different ink blur. The other cause is in that a landing position of an ink drop on a printing medium is displaced. The problem due to the latter cause can be solved by improving the precision of paper feeding or the precision of head positioning control. However, in the case of high-density printing, positioning of the landing position needs a higher degree of accuracy. Also, the precision of paper feeding largely varies depending on a type of print sheets, thus it is difficult to realize precise positioning control.

SUMMARY OF THE INVENTION

The present invention has been made in consideration of the above situation, and has as its object to provide a printing method and apparatus therefor and a printing system which obviate the difference in density between the image printed by multi-scanning and the image printed by single-scanning.

Another object of the present invention is to provide a printing method and apparatus therefor and a printing system which obviate the difference in density between the image printed by multi-scanning and the image printed by single-scanning, by increasing the density of the printed image in the case of multi-scan printing.

Another object of the present invention is to provide a printing method and apparatus therefor and a printing system which obviate the difference in density between the image printed by multi-scanning and the image printed by single-scanning, without consideration of a type of a printing medium used in the printing.

Another object of the present invention is to provide a printing method and apparatus therefor and a printing system which obviate the difference in density between the image printed by multi-scanning and the image printed by single-scanning, without consideration of the number of times of multi-scanning operation at the time of printing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a drawing which shows the structure of a printing portion of a general color ink-jet printer;

FIG. 4 is an explanatory view which explains the printing method employing the multi-scanning method;

FIG. 17 is a flowchart showing processing in an image processing circuit according to the present embodiment.

DETAILED DESCRIPTION OF THE PREFERRED EMBODIMENTS

Preferred embodiments of the present invention will be described in detail in accordance with the accompanying drawings.

First Embodiment

Figure 1:
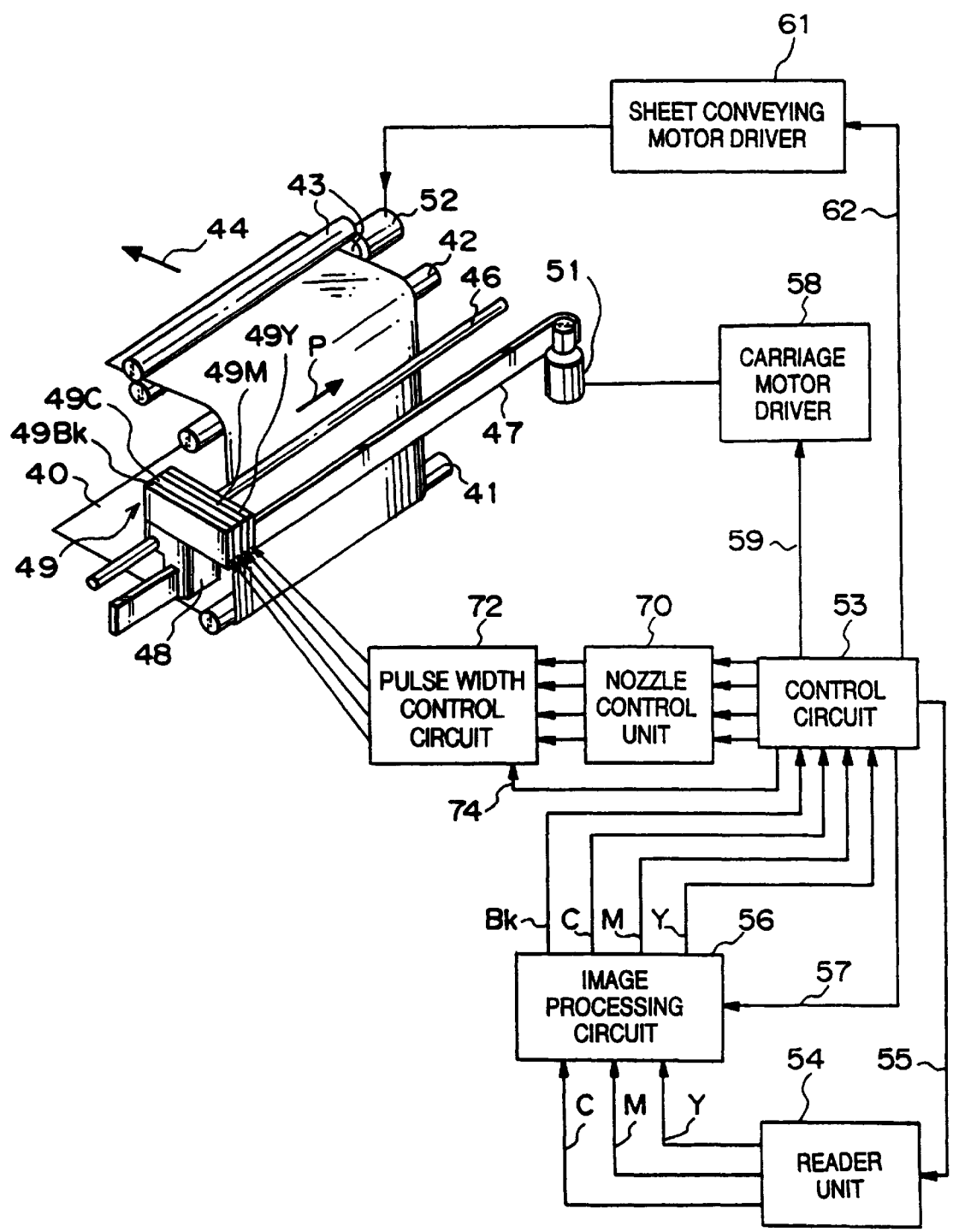
FIG. 1 is a block diagram showing a general arrangement of a color ink-jet printing system according to a present embodiment of the present invention.
Figure 3B:
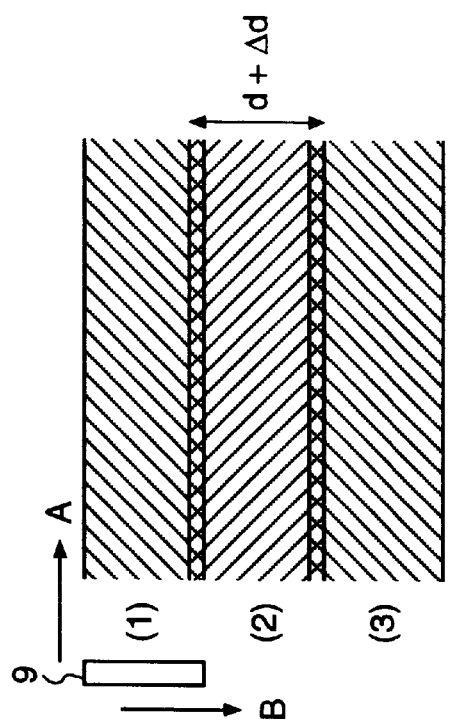
FIGS. 3A and 3B are explanatory views for explaining the state where a black line is formed at the time of printing by multi-scanning.
Figure 3A:
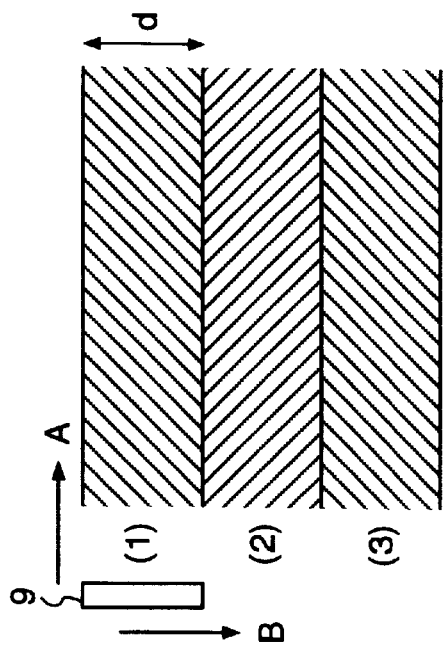

FIG. 1 shows an arrangement of an ink-jet printing system according to the first embodiment.

In FIG. 1, a print sheet 40 provided as a printing medium is conveyed via conveying rollers 41 and 42 and held between a set of feeding rollers 43. The feeding rollers (sheet conveying roller) 43 are rotationally driven by a sheet conveying motor 52. In accordance with a sheet conveying signal 62 sent from a control circuit 53, a sheet conveying motor driver 61 rotationally drives the sheet conveying motor 52, thereby conveying the print sheet 40 in a direction indicated by an arrow 44.

A guide axis 46 is arranged in parallel with the print sheet 40. An ink-jet head 49 having a plurality (herein, four) of printheads (49Y, 49M, 49C and 49Bk) and being mounted upon a carriage 48 is reciprocally moved for a print scanning operation by driving a carriage motor 51. The carriage motor 51 is rotationally driven by a carriage motor driver 58 in accordance with a driving signal 59 sent from the control circuit 53. Note that the carriage 48 is reciprocally moved by the carriage motor (stepping motor) 51 via a timing belt 47.

The ink-jet head 49 mounted on the carriage 48 comprises a cyan head 49C whose ink color is cyan, a magenta head 49M whose ink color is magenta, an yellow head 49Y whose ink color is yellow and a black head 49Bk whose ink color is black. Each color ink head is connected to an ink tank having a corresponding color of ink.

The print sheet 40 is intermittently conveyed in the direction of the arrow 44, and while the print sheet 40 is stopped, the ink-jet head 49 (carriage 48) scans in the direction indicated by an arrow P, discharging ink drops corresponding to an image signal, thereby performing a printing operation.

Figure 8A:
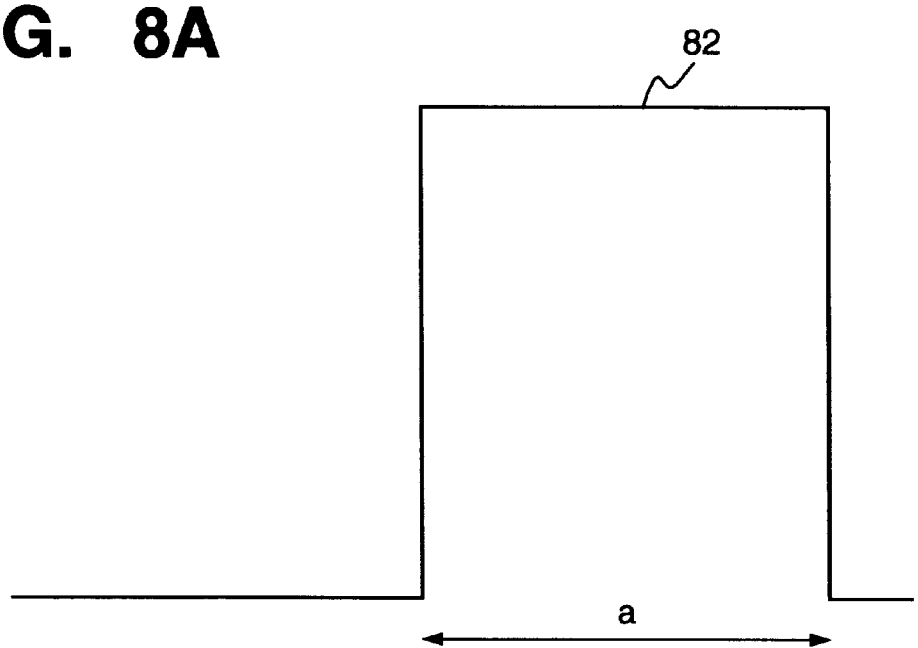
FIGS. 8A and 8B are graphs showing waveforms of a head driving pulse output from a pulse control circuit.
Figure 8B:
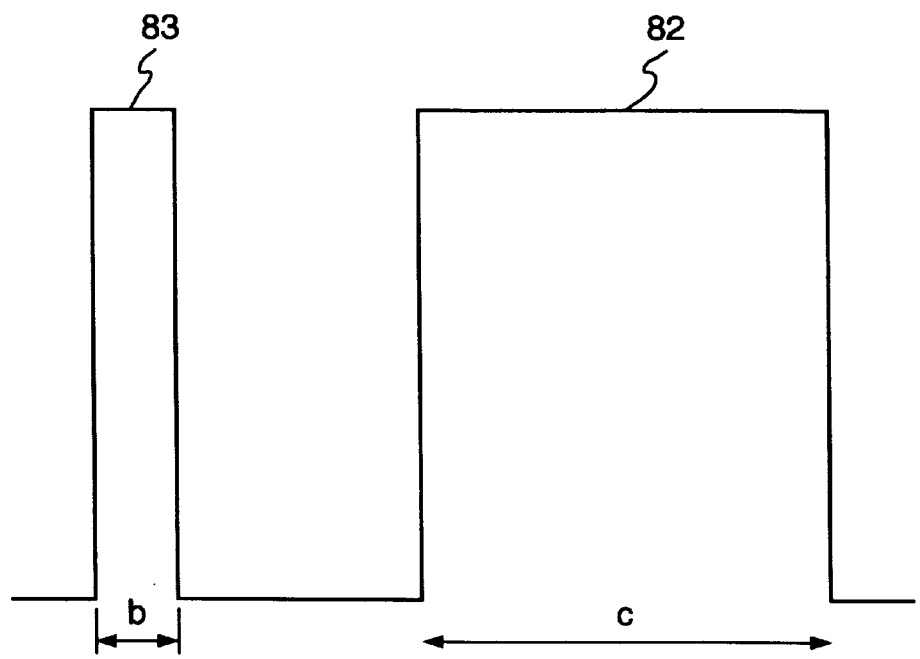

The control circuit 53 which controls the printing operation outputs a reader control signal 55 to a reader unit (or a host computer) 54. The reader unit 54 reads an image to be printed in accordance with a request from the control circuit 53, and outputs an image signal to an image processing circuit 56 as Y, M and C image signals. In the image processing circuit 56, a predetermined image process is performed on the Y, M and C image signals and corresponding Y, M, C and Bk image signals are output. The control circuit 53 receives the Y, M, C and Bk image signals from the image processing circuit 56 as a density signal to be outputted by the ink-jet printing unit. Print data corresponding to the density signal is generated and output to a nozzle control unit 70, and the print data is sent to the ink-jet head 49 via a pulse width control circuit 72. The pulse width control circuit 72 changes a driving pulse width which drives the ink-jet head 49 as shown in FIGS. 8A and 8B, in accordance with a designation signal 74 from the control circuit 53, thereby controlling the printhead 49. At the same time, the control circuit 53 outputs the driving signal 59 to the carriage motor driver 58 to drive the carriage motor 51. A signal 57 sent from the control circuit 53 to the image processing circuit 56 is to instruct a processing method or the like for the image signal from the reader unit 54.

Figure 5:
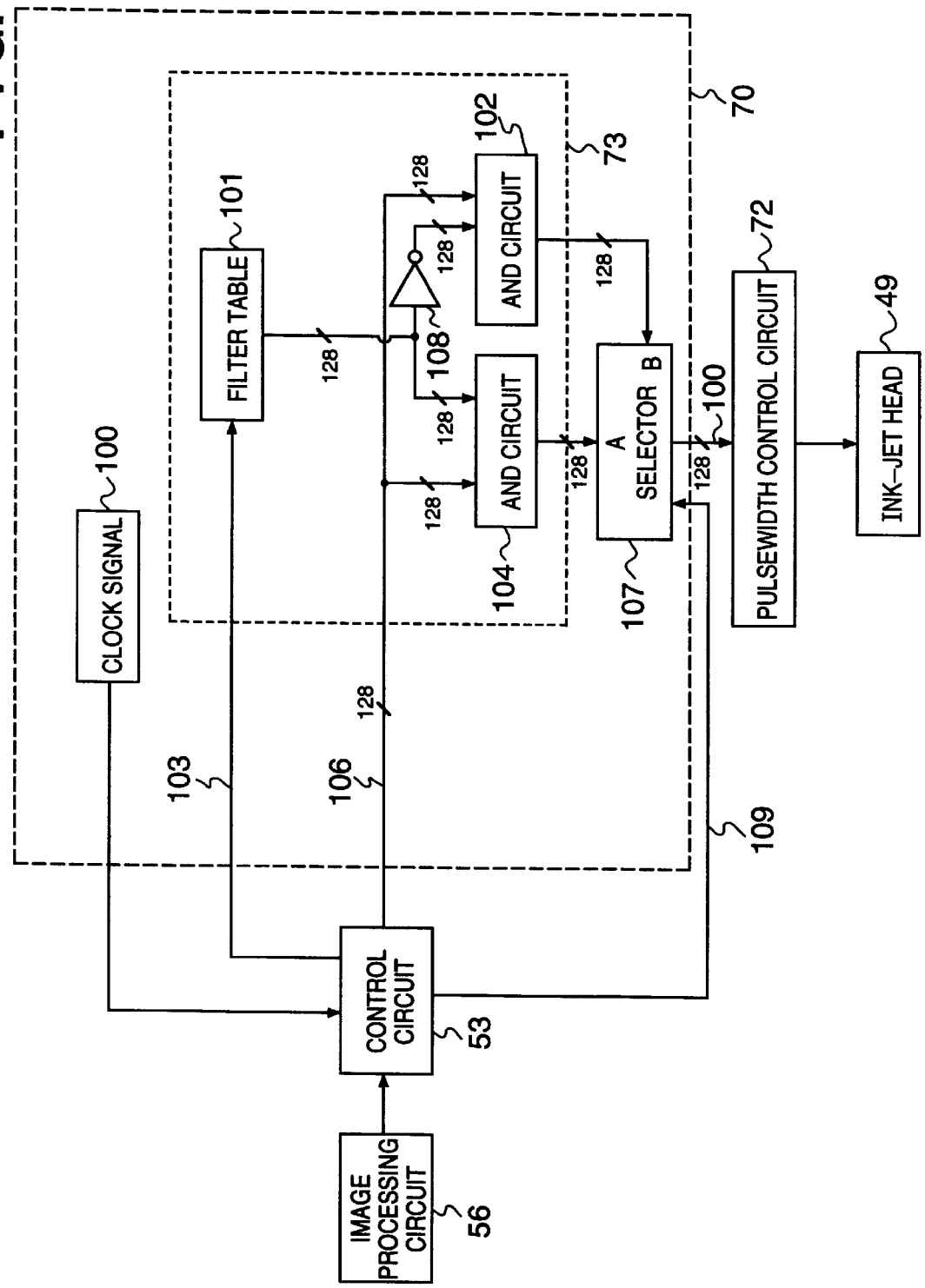
FIG. 5 is a block diagram showing the arrangement of a nozzle control unit according to the present embodiment.

FIG. 5 is a block diagram showing the arrangement of the nozzle control unit 70. Herein, the ink-jet head 49 includes 128 nozzles for each color. The nozzle control unit 70 is configured such that an image corresponding to one band width (a print width printed by the ink-jet head 49) is formed by scanning twice with the ink-jet head 49.

An image signal inputted from the image processing circuit 56 to the control circuit 53 is sent to AND circuits 102 and 104 as image data 106 after a predetermined image processing is performed by the control circuit 53. The AND circuits 102 and 104 each comprises 128 units of AND gates and an inverter 108 has 128 inverting gates. A clock signal 100 is a pixel synchronization signal which synchronizes with the image data 106, and is input to the control circuit 53. Reference numeral 101 denotes a filter table to be described later with reference to FIG. 6, wherein data (mask data having 128 bits) selected by a select signal 103 sent by the control circuit 53 is output to the AND circuit 104 and the AND circuit 102 via the inverter 108. Note that the data output from the filter table 101 is, for instance, in a case where the ink-jet head 49 includes 128 nozzles, a signal having 128 bits. Reference numeral 107 denotes a selector which selects image data from either of the AND circuits 102 or 104 in accordance with a select signal 109 sent by the control circuit 53, and outputs the data to the ink-jet head 49 via the pulse width control circuit 72. Note that reference numeral 73 denotes a pattern generation unit which generates print data in accordance with data in the filter table 101, and herein, performs thinning out the image data 106 and generating interpolation data by utilizing the filter table 101.

The control circuit 53 sends the select signal 109 to instruct the selector 107, for instance, to select the output of the AND circuit 104 in the first scanning and select the output of the AND circuit 102 in the second scanning. Accordingly, with respect to the same data from the filter table 101, image data not printed in the first scanning is printed in the second scanning. In this manner, a pixel to be printed by the plural scanning operation is printed at least once, and the pixels printed by each of the scanning operation form an image corresponding to one-scanning data as shown in FIG. 4; as a result, desired image data is printed by multi-scanning. Note that although printing is performed by scanning twice in the present embodiment, the present invention is not limited to this; and printing can be realized by scanning many more times. In such case, it is necessary to include a number of AND circuits 102 and 104 corresponding to the number of times of scanning. Also, a selector or the like is included for determining which AND circuit to be selected in each scanning.

Figure 6:
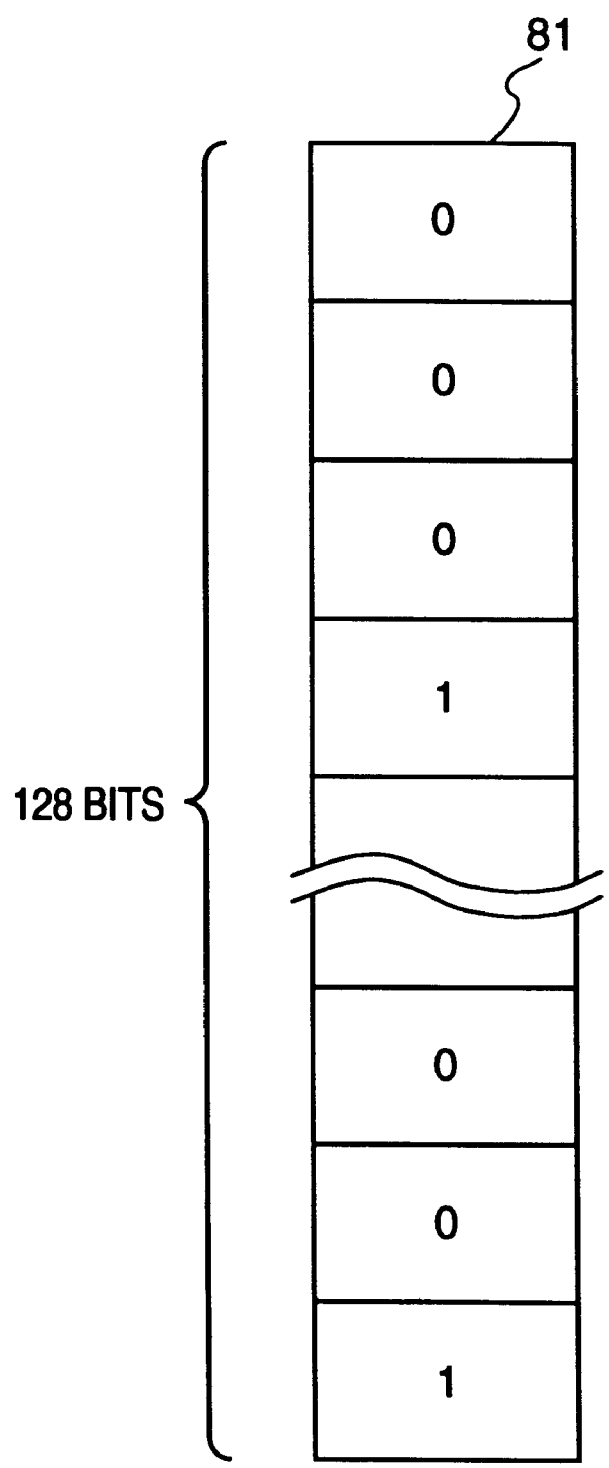
FIG. 6 is an explanatory view for explaining data stored in a file table according to the present embodiment.

FIG. 6 is a model view showing the data structure of the filter table 101. Herein, a set of data is structured by, for instance, 128 bits in correspondence with the number of nozzles of the ink-jet head 49. Plural sets of such file data are included and one of the plural sets is selected by the select signal 103 sent from the control circuit 53 to be output.

The filter table 101 serves to provide filtering effects so that a dot arrangement which does not generate the black line can be realized. An example will be described below in a case where a pattern 81 in FIG. 6 is used.

In synchronization with the clock signal 100, the image data 106 output by the control circuit 53 is supplied to the ink-jet head 49 as image data, via the AND circuits 102, 104 and the pulse width control circuit 72. Herein, it is assumed that the pattern 81 (FIG. 6) is applied as an example. When the image data 106 corresponding to each nozzle is sent out, if the pattern data 81 is output from the filter table 101, pixel-data of image data corresponding to "0" in the pattern 81 is gated by the AND circuit 104 thereby not outputted, and pixel-data of image data corresponding to "1" in the pattern 81 is output to the ink-jet head 49 via the AND circuit 104 and the pulse width control circuit 72. In this embodiment, the output of the AND circuit 104 is selected by the selector 107 at the time of the first scanning; thus, printing is performed accordingly by the ink-jet head 49. By virtue of the AND circuit 104, printing where pixels are thinned out can be performed using the pattern 81 shown in FIG. 6.

In the second scanning, the pattern 81 in the filter table 101 is utilized as similar to the first scanning. At this time, the output of the AND circuit 102 is selected by the selector 107 and output to the ink-jet head 49 via the pulse width control circuit 72. The AND circuit 102 gates pixel data of the image data with an inverted output of the pattern 81 from the inverter 108. Accordingly, pixels thinned out (not printed) in the first scanning can be printed in the second scanning.

Figure 7:
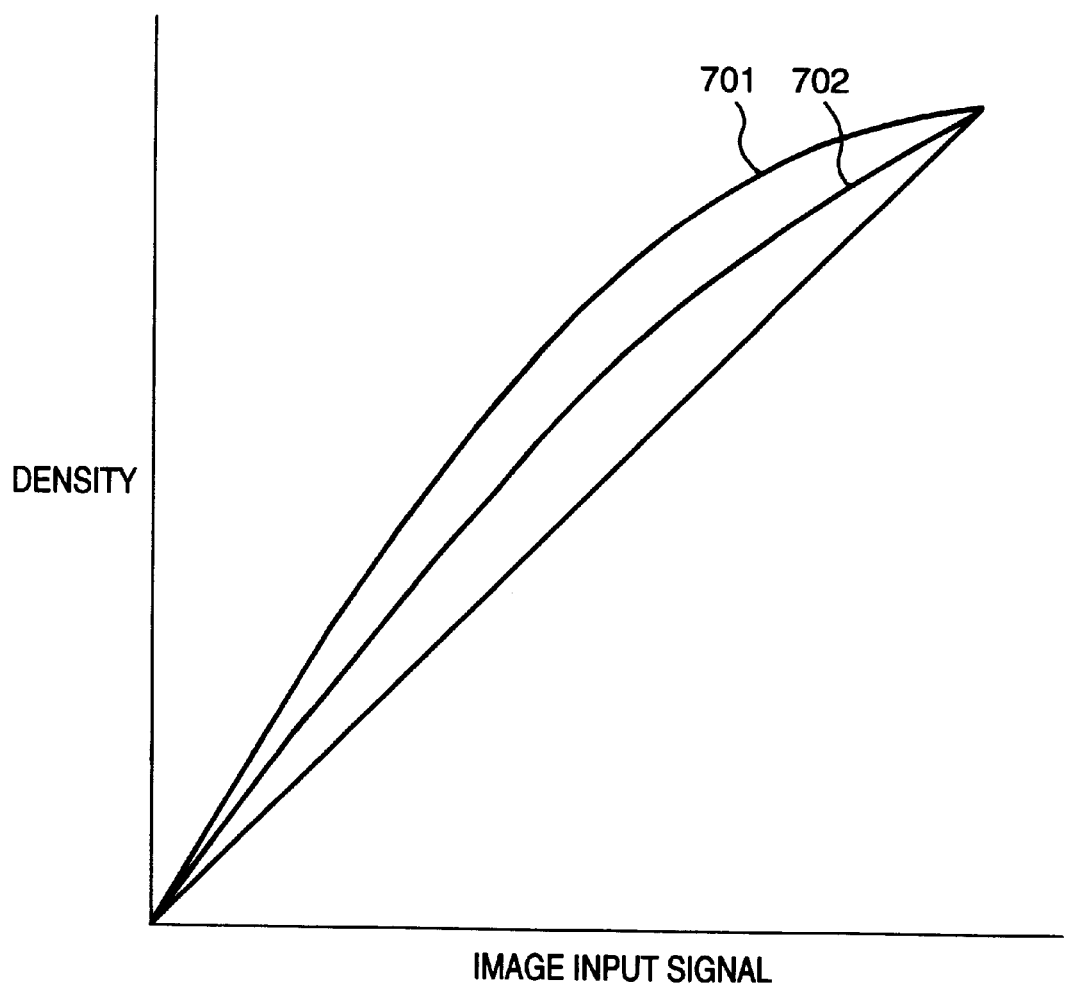
FIG. 7 is a graph showing densities of an image printed in a single-scan mode and a multi-scan mode.

However, an image obtained by the above described multi-scanning includes different density as shown in FIG. 7, between a density 701 of an image printed by single-scanning and a density 702 of an image printed by multi-scanning. In other words, an image printed by general single-scanning has a higher image density than an image printed by multi-scanning. In order to minimize the difference in density, when printing is performed by multi-scanning, a pulse 83 which is not sufficient to discharge ink as shown in FIG. 8B is impressed on an ink discharge heater of the ink-jet head 49, then a main pulse 82 is impressed to discharge ink. In the foregoing manner, by increasing the amount of ink discharge at the time of multi-scanning, the difference in density is corrected.

For instance, in the case where the waveform shown in FIG. 8A is the normal discharge pulse 82 (pulse width a), the pulse 83 (pulse width b: a>b) which is not sufficient to discharge ink is impressed before the pulse 82, as illustrated in FIG. 8B.

Figure 9:
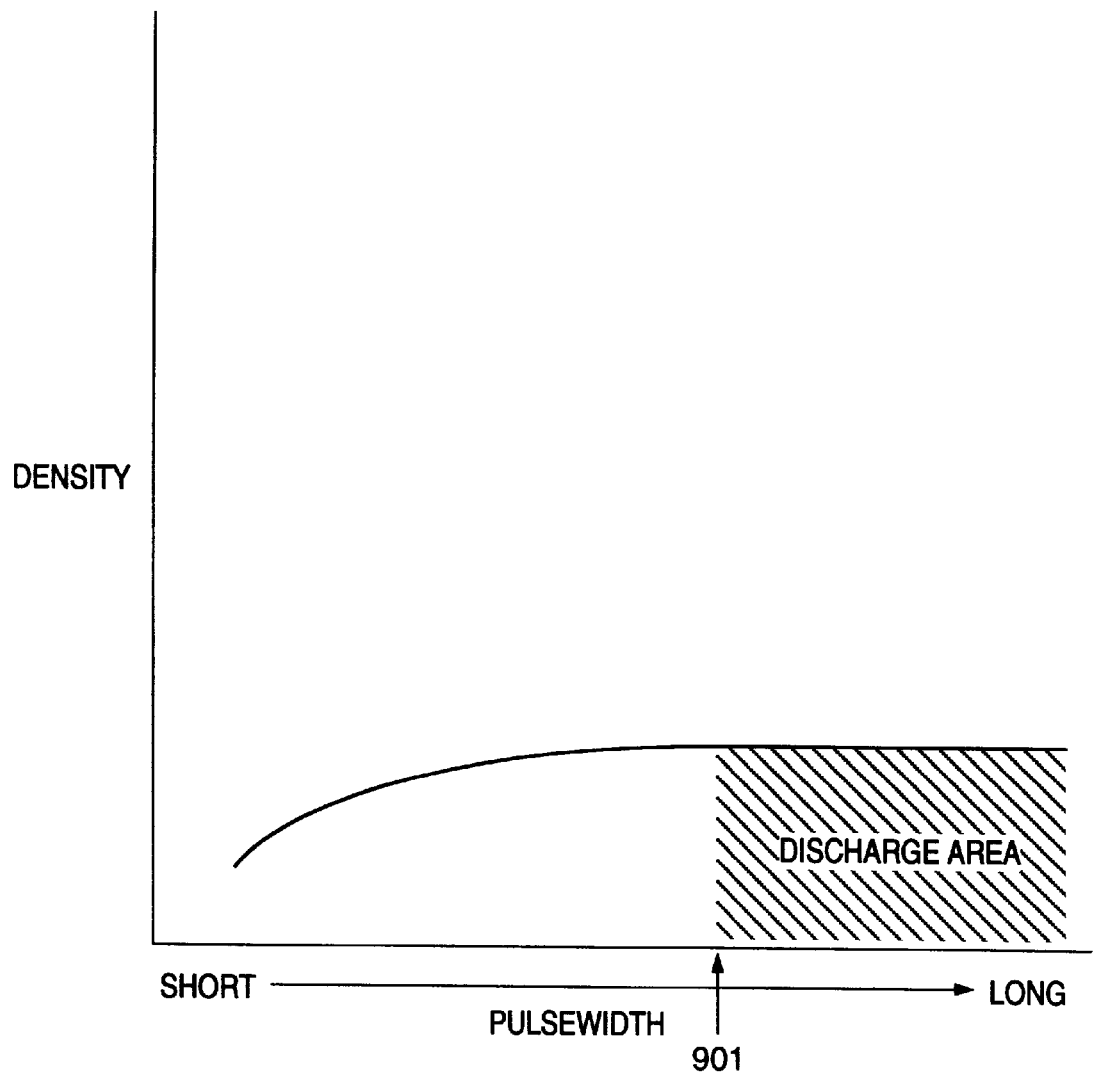
FIG. 9 is a graph showing a relationship between a pulse width of a head driver pulse and an image density to be printed.

The relationship between a pulse width of the pulse 83 and a printed image density is shown in FIG. 9. Referring to FIG. 9, reference numeral 901 denotes a pulse width which is sufficient to discharge ink. The pulse width of the pulse 83 must be set lower than the pulse width 901.

On the basis of the above relationship, a pulse width b of the pulse 83 which is used to correct density of a printing image is set and instructed to the pulse width control circuit 72. By outputting the pulse 83 immediately before the pulse 82, correction of the image density is realized. In addition, in terms of a heating method, a heater may be arranged exterior to the ink-jet head 49, and the amount of ink discharge may be changed by heating the printhead using the external heater.

Figure 10:
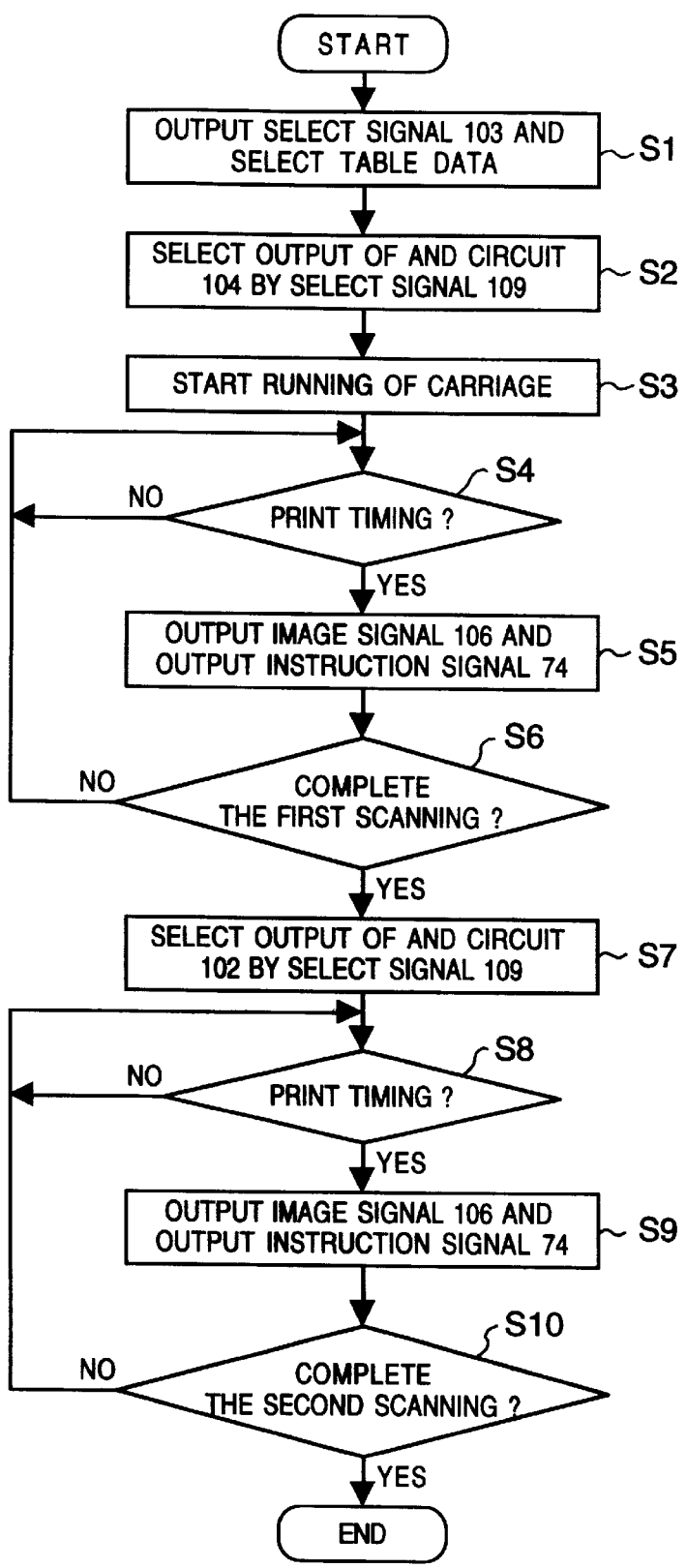
FIG. 10 is a flowchart showing control operation performed by a control circuit according to the present embodiment of the present invention.

FIG. 10 is a flowchart showing multi-scanning processing of the control circuit 53 where data corresponding to one band width is printed by scanning twice. A control program for executing such processing is stored in a memory of the control circuit 53 and executed by a CPU such as a microcomputer or the like included in the control circuit 53.

The processing starts when an image signal from the reader unit 54 (or a host computer) is input via the image processing circuit 56, and image data corresponding to e.g. one band width (a print width obtained in a case where printing is performed by using all the 128 nozzles included in the ink-jet head 49) is stored in a memory (print buffer) of the control circuit 53. In step S1 in FIG. 10, a data set in the filter table 101 to be used is selected by the select signal 103. In step S2, an instruction is given by the select signal 109 that the selector 107 selects an output of the AND circuit 104 and outputs to the ink-jet head 49. When printing preparation is made in the foregoing manner, the processing proceeds to step S3 where the carriage motor 51 is rotationally driven via the carriage motor driver 58 to start running the carriage 48.

Upon running the carriage 48, the processing proceeds to step S4 where determination is made whether or not the ink-jet head 49 reaches the printing position by utilizing a signal from an encoder (not shown) or the like. When the ink-jet head reaches the printing position and print timing is ready, the processing proceeds from step S4 to S5 where the image data 106 is output and an instruction is sent by an instruction signal 74 to the pulse width control circuit 72 to generate the above-described driving pulse shown in FIG. 8B, for example. The processing then proceeds to step S6. The processing of steps S4 to S6 is repeated until the first scanning is completed.

When printing by the first scanning is completed, the processing proceeds from step S6 to S7 where the carriage 48 is returned to a home position, the running of the carriage 48 is started for executing the printing by the second scanning, and an instruction is given by the select signal 109 that the selector 107 selects an output of the AND circuit 102 at the time of the second scanning. In steps S8 to S10, as similar to the aforementioned steps S4 to S6, the image data 106 is output in synchronization with the running of the carriage 48 and printing is performed by driving the ink-jet head 49. Note that in the second scanning, it is assumed that the filter table 101 selects the same data set in the first scanning.

By the above operation, a pixel in the image data 106 which is not printed in the first scanning because the pattern data from the filter table 101 is "0" while the pixel data is "1", is printed in the second scanning. In the second scanning, a logical AND between the image data 106 and file data inverse by an inverter 108 is obtained and output to the AND circuit 102.

Figure 11:
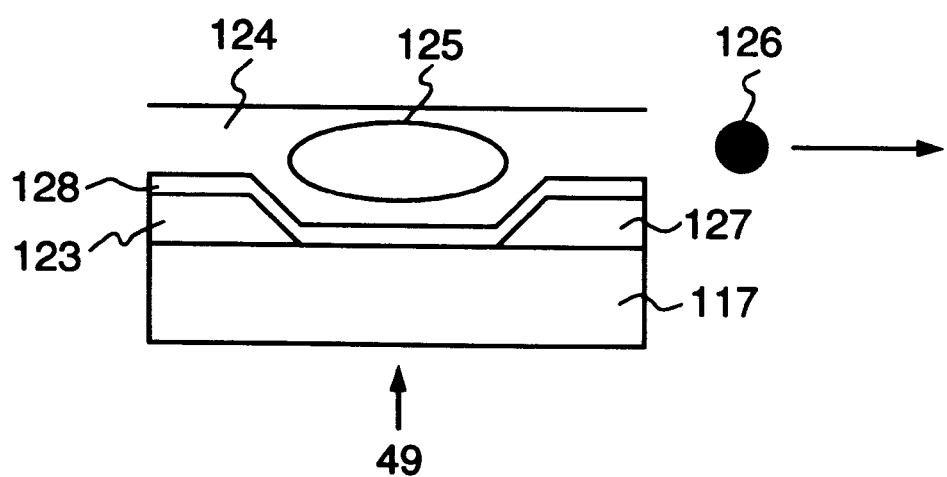
FIG. 11 is a cross-sectional view of a nozzle of an ink-jet head.

FIG. 11 is a cross-sectional view of a nozzle of the ink-jet head 49 according to the present embodiment.

On an ink discharge heater 117, a 20 V power line 123 and a wiring electrode 127, to which a collector of a transistor (not shown) for driving the ink discharge heater 117 is connected, are arranged. On the ink discharge heater 117, 20 V power line 123 and wiring electrode 127, an insulating layer 128 for separating ink in the nozzle 124 is formed. On the insulating layer 128, the nozzle 124 filled with ink is arranged.

Based on the foregoing structure, when the transistor for driving the ink discharge heater is turned on in accordance with the driving pulse from the pulse width control circuit 72, electric current is sent to the corresponding ink discharge heater 117, heating the ink in the nozzle 124 thereby generating a bubble 125 inside the nozzle 124 near the heater 117. Since the bubble 125 is generated, pressure is added to the ink in the nozzle 124, causing to discharge a portion of the ink from the nozzle 124 as an ink drop 126, printing an image corresponding to the image data on a print sheet.

Second Embodiment

In the first embodiment, a pulse width which drives the ink-jet head 49 is altered to change the density of a printing image. In the second embodiment, the difference in density and colors in printed images is corrected by changing a method of processing an image signal in the image processing circuit 56.

Depending on an environment where a printer apparatus is placed, the temperature of the ink-jet head 49 is sometimes increased so high that ink discharge becomes unstable, causing to form a low quality image. In addition, even if a control of the temperature of the ink-jet head 49 is performed, e.g. as in the first embodiment, in a case where heat capacity of the print head 49 is large, density control of an image to be printed becomes difficult. In consideration of the above, according to the second embodiment, image processing is performed to a print image signal so that a high quality image can be obtained without being influenced by external environment.

Figure 12:
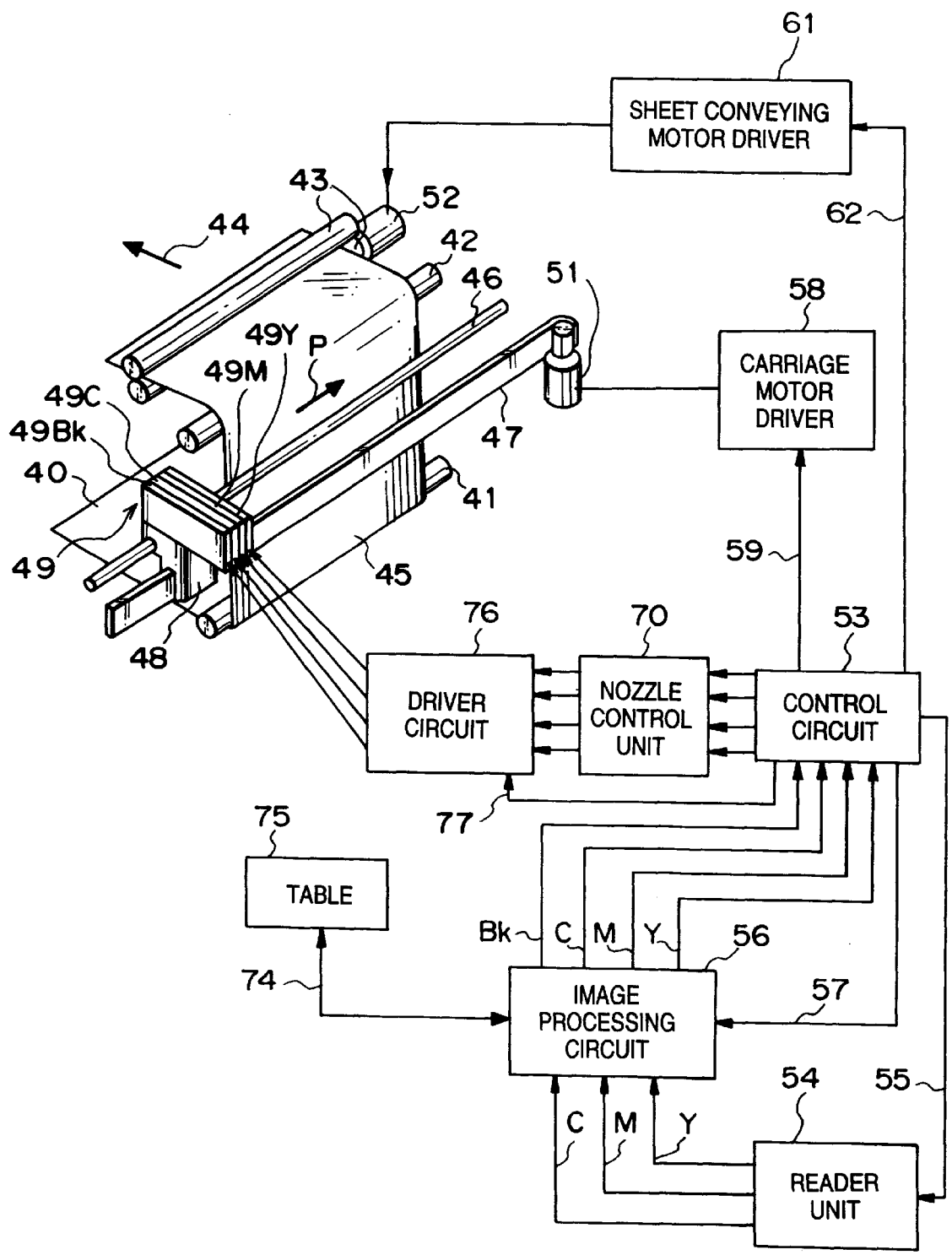
FIG. 12 is a block diagram showing a general arrangement of an ink-jet printing system according to the second embodiment of the present invention.

FIG. 12 is a perspective view of a model-type color ink-jet printing system and control functions thereof according to the second embodiment. Those components identical to the above-described drawings are designated by like reference numerals and are not described redundantly.

The relationship of image data and density when printing is performed by multi-scanning and normal single-scanning operation has been already described with reference to FIG. 7. When printing is performed by multi-scanning, correction is performed on an image signal by the image processing circuit 56 using a correction coefficient Hk which satisfies the following equation:

$$f(a) = Hk \times f(b)$$

where a function of the curve 701 in FIG. 7 is f(a) and a function of the curve 702 in FIG. 7 is f(b).

Moreover, the present embodiment includes a table 75 which stores a plurality of the above correction characteristic data (coefficient). In the table 75, data is prepared for performing correction also in the case where density or colors are changed in accordance with the number of times of multi-scanning. By virtue of this, a high-quality image can be obtained without consideration of the number of times of multi-scanning.

In this case, the image processing circuit 56 determines in accordance with a signal 57 sent from the control circuit 53 whether or not printing is performed by multi-scanning. If printing is performed by multi-scanning, a correction coefficient in the table 75 is selected depending on the number of times of the scanning, to perform correction on an image signal, and the corrected image data is output to the control circuit 53. Note that the reference numeral 76 denotes a driver circuit. Ink is discharged by driving the ink-jet head 49 in the timing corresponding to a signal 77 sent from the control circuit 53, in accordance with image data from the nozzle control unit 70.

Note that the processing in the control circuit 53 and image processing circuit 56 in this case will be described later with reference to the flowcharts in FIGS. 16 and 17.

Third Embodiment

Figure 13:
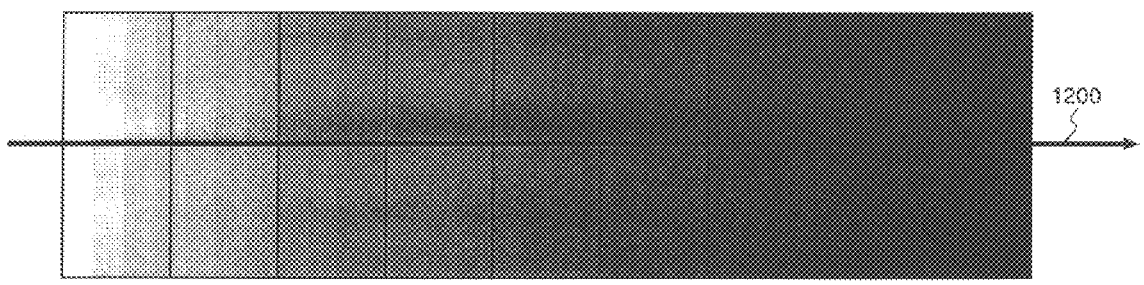
FIG. 13 shows as an example a sample image printed by the third embodiment of the present invention.

FIG. 13 shows a printed example of tone image data printed in one of the colors by the ink-jet printer according to the present embodiment.

In the above-described second embodiment, the table 75 which stores a correction coefficient of an image signal for correcting density of a printed image is prepared. When printing is performed by multi-scanning, the image signal is multiplied by the correction coefficient in the image processing circuit 56 thereby forming a high-quality image.

In the third embodiment, in order to improve the colors which apt to change depending on a printing medium or because of inequality of the ink-jet head 49, a sample image (the upper part of the line 1200 in FIG. 13) printed by single-scanning and a sample image (the lower part of the line 1200 in FIG. 13) printed by multi-scanning are read by e.g. the above described reader unit 54. Based on the difference in density of the sample images, correction data is obtained in the above described manner and an image signal is corrected in accordance with the correction data. Accordingly, the difference in density of a print image printed by single-scanning and by multi-scanning can be corrected, and a high-quality image can be obtained.

For instance, a sample image of tone density, in which duty of image data ranges from 0% to 100% as shown in FIG. 13, is printed for each color on various printing media by the general single-scanning method and the multi-scanning method. In the example shown in FIG. 13, the upper portion of the image has a slightly higher density.

The sample images printed on the various printing media are read by the reader unit 54 and the printed density obtained by single-scanning and the density obtained by multi-scanning are compared for each printing medium. On the basis of the comparison result, data for the correction table 75 is calculated for each of the printing media, and density correction data in multi-scan printing most appropriate for various printing media is generated.

Furthermore, correction data corresponding to the number of times of multi-scanning may also be generated for each printing medium, by changing the number of times of multi-scanning and reading density of the sample image printed in each multi-scanning.

The correction data generated in the above described manner is stored in the table 75. In accordance with a type of a printing medium and/or the number of times of multi-scanning, the correction data stored in the table 75 is referred to as necessary by the image processing circuit 56. By performing image processing in such manner, a printed image having no density difference between the printing by single-scanning and the printing by multi-scanning can be obtained.

Figure 14:
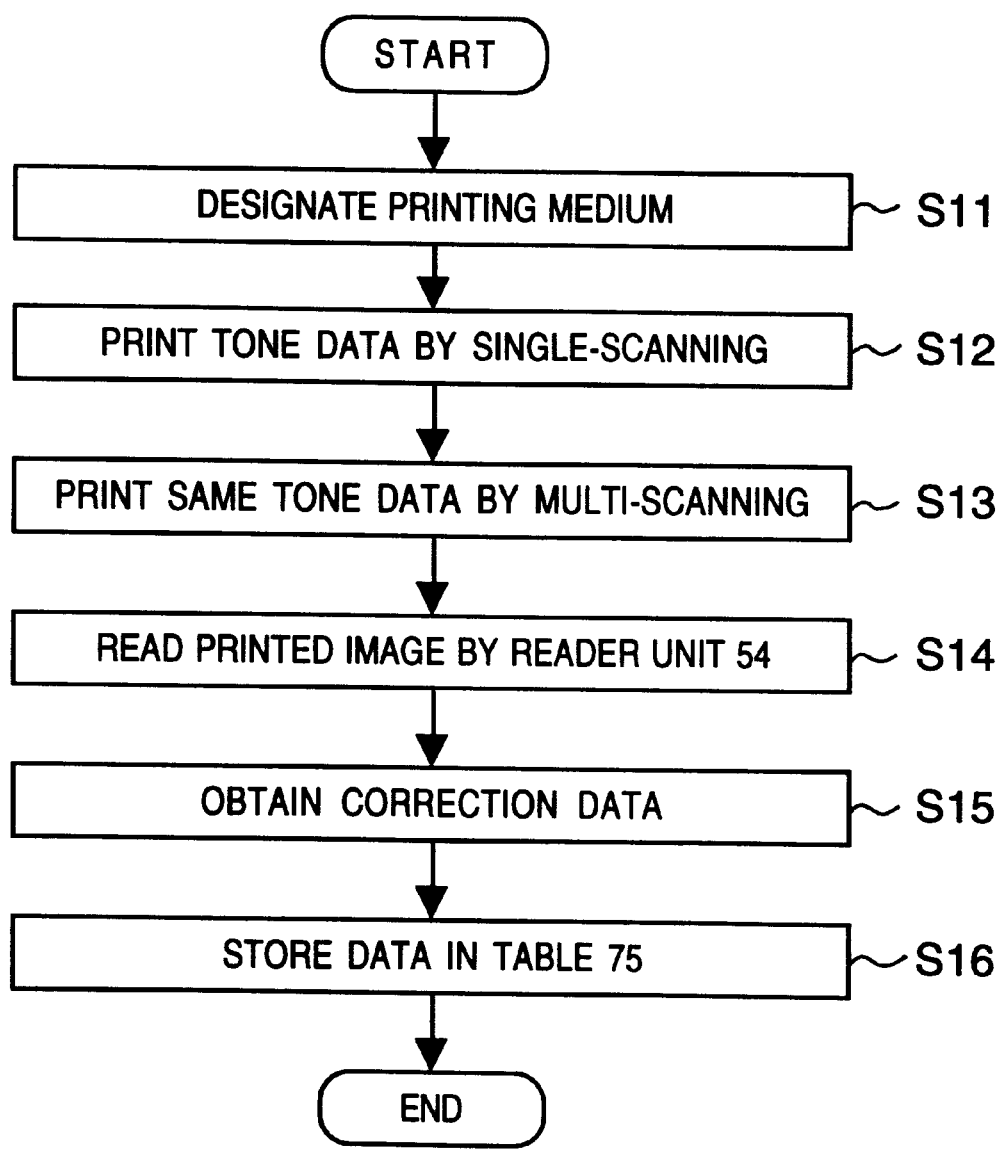
FIG. 14 is a flowchart showing processing of generating correction data corresponding to a printing medium by reading the sample image printed on various types of printing media according to the third embodiment.

FIG. 14 is a flowchart showing the processing of generating correction data by designating a printing medium, printing tone data on the designated printing medium and reading the printed image.

In step S11, a printing medium to be used for printing is designated. In step S12, the tone data as shown in FIG. 13 is printed as a sample image by single-scanning. Then in step S13, the same data is printed by multi-scanning. Next in step S14, the printed sample images are read by the reader unit 54. In step S15, on the basis of the difference between the image density obtained by single-scanning and the density of the image printed by multi-scanning, correction data for correcting an image signal of multi-scan printing (or single-scan printing) is generated. The correction data is stored in the table 75 in correspondence with the type of the printing medium on which the sample image is printed.

Figure 15:
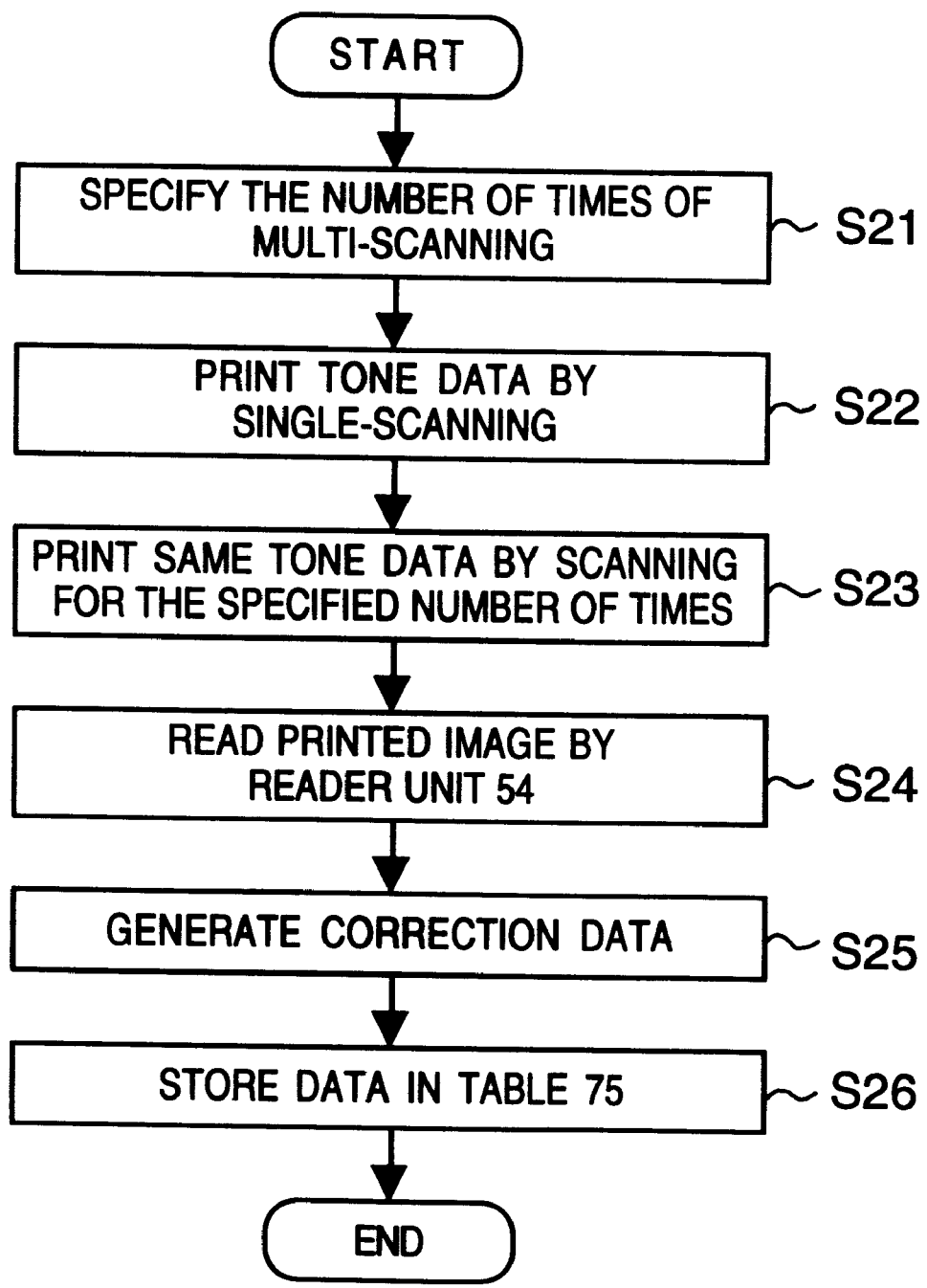
FIG. 15 is a flowchart showing processing of generating correction data corresponding to the number of times of multi-scanning by specifying the number of times of multi-scanning and reading the printed image according to the third embodiment.

FIG. 15 is a flowchart showing the processing of generating correction data which corresponds to the number of times of multi-scanning and storing the data in the table 75.

In step S21, the number of times of multi-scanning necessary for printing is specified. In step S22, the tone data as shown in FIG. 13 is printed by single-scanning. Then the processing proceeds to step S23 where the same tone data is printed by performing scan for the specified number of times. Next in step S24, the printed sample images are read by the reader unit 54. In step S25, on the basis of the difference between the image density obtained by single-scanning and the image density obtained by multi-scanning, correction data for correcting an image signal of multi-scan printing (or single-scan printing) is generated. The correction data is stored in the table 75 in correspondence with the number of times of the scan which printed the sample image.

Note that the processing shown in FIGS. 14 and 15 may be combined to generate correction data which corresponds to a type of a printing medium and the number of times of multi-scanning, and the correction data may be stored in the table 75.

In the above described manner, correction is performed on an image signal by the image processing circuit 56, utilizing the correction data table 75 generated in the processing described in FIGS. 14 and 15. For the above processing, the control circuit 53 only needs to instruct the image processing circuit 56 the type of a printing medium to be used for printing and/or the number of times of multi-scanning. The control circuit 53 needs not output the instruction signal 74 to change a width of the driving pulse as described in steps S5 and S9 in the flowchart in FIG. 10 (thus, the pulse width control circuit 72 described in the first embodiment is unnecessary).

Figure 16:
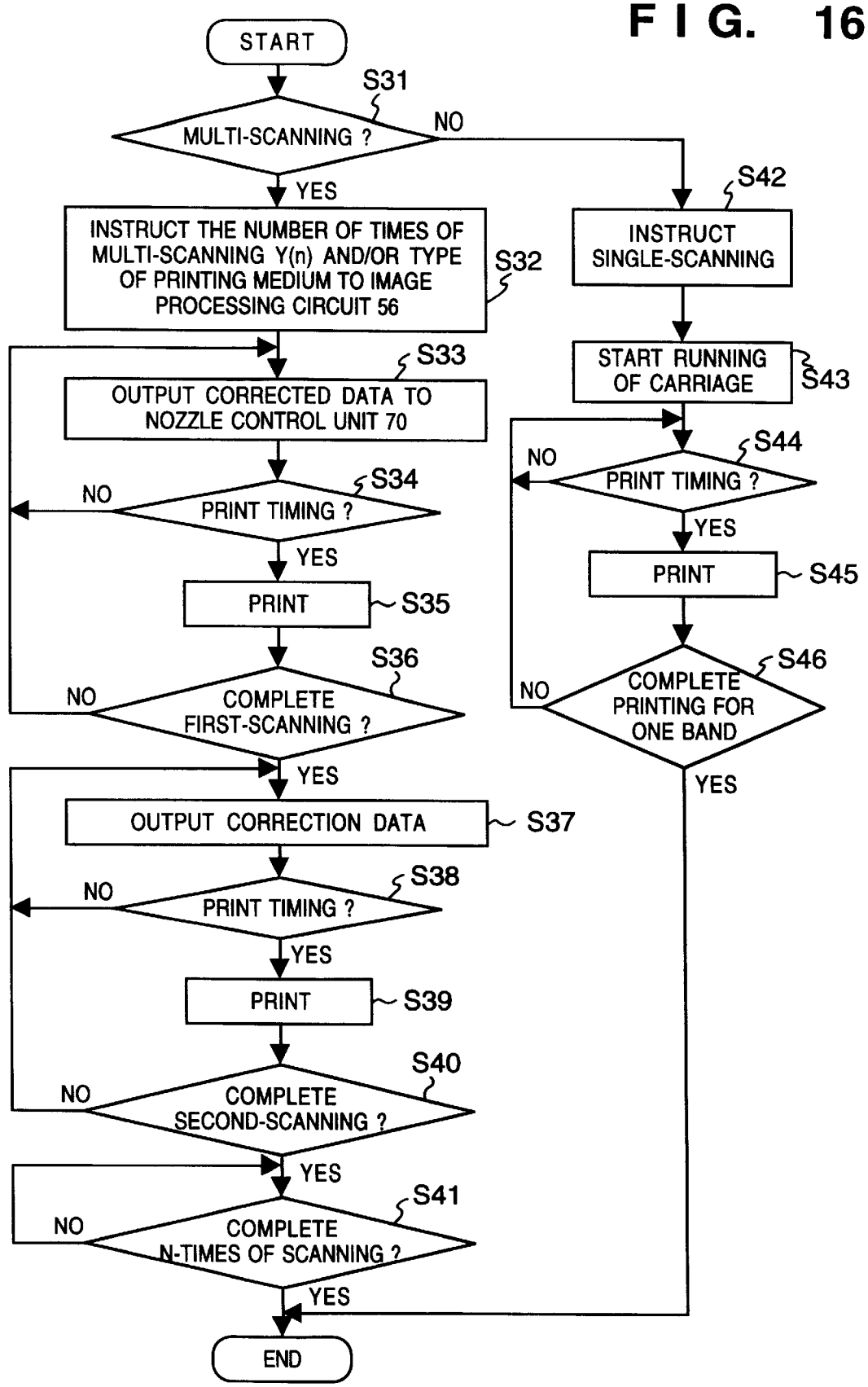
FIG. 16 is a flowchart showing processing in a control circuit according to the present embodiment.

FIG. 16 is a flowchart showing the processing of printing data corresponding to one band by the control circuit 53 in the state where correction data, used for correcting an image signal in accordance with the number of times of multi-scanning and/or a type of a printing medium, is stored in the correction data table 75 as described above.

In step S31, it is determined which of the printing methods is selected: the printing by multi-scanning (the number of times n) or the printing by single-scanning. When printing by multi-scanning is selected, the processing proceeds to step S32 where the number of times of multi-scanning and/or a type of a printing medium is informed to the image processing circuit 56. In step S33, running of the carriage 48 is started, mask data corresponding to the number of times of multi-scanning is selected by the select signal 103, and the select signal 109 for selecting image data is output. Image data processed by the image processing circuit 56 is received, and image data to be printed first is output to the nozzle control unit 70. Note that in the circuit shown in FIG. 5, printing is performed by scanning twice; however, the circuit configuration of the nozzle control unit 70 is changed or set in advance in accordance with the number of times of multi-scanning, as described above.

In step S34, it is determined whether the ink-jet head 49 is moved to a predetermined position, that is, whether or not it is in a print timing, and when it is in the print timing, the processing proceeds to step S35 where the signal 77 is output to drive the ink-jet head 49, executing the printing. The steps S33 to S36 are repeatedly executed until the first print scanning is completed in step S36. When the first scanning is completed, the carriage is returned and the processing proceeds to step S37.

Similarly, in the next steps S37 to S40, print processing is performed by outputting image data to be printed by the second scanning. The above described processing is repeatedly executed for the specified number of times, performing n times of multi-scan printing.

In a case where single-scan printing is specified, the processing proceeds to step S42 where single-scan printing is instructed to the image processing circuit 56 and the nozzle control unit 70. The image processing circuit 56 executes correction on an image signal using data for single-scanning, and the nozzle control unit 70 outputs the image data to the driver circuit 76 without thinning out the data. Accordingly, in steps S43 to S46, data corresponding to one band is printed by scanning once with the ink-jet head 49.

FIG. 17 is a flowchart showing the processing in the image processing circuit 56 of the present embodiment.

In step S51, an instruction to specify either of multi-scan printing (as well as the number of times n) or single-scan printing, and/or a type of printing medium used for the printing is input from the control circuit 53. In step S52, correction data corresponding to the multi-scanning/single-scanning and/or the type of the printing medium is read out from the table 75. In step S53, an image signal inputted from the reader unit 54 (or a host computer) is multiplied by the correction data read out of the table 75 to obtain corrected image data. Then the processing proceeds to step S54 where the corrected image data is output to the control circuit 53.

The present invention can be applied to a system constituted by a plurality of devices (e.g., host computer, interface, reader, printer) or to an apparatus comprising a single device (e.g., copy machine, facsimile or the like).

Further, the object of the present invention can be also achieved by providing a storage medium storing program codes for performing the aforesaid processes to a system or an apparatus, reading the program codes with a computer (e.g., CPU, MPU) of the system or an apparatus from the storage medium, then executing the program.

In this case, the program codes read from the storage medium realize the functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

As has been described above, according to the present embodiments, when an image is printed by the multi-scanning method, colors or density of an image signal are altered to obtain a high-quality image having no density difference even when the image is compared with an image printed by the normal single-scanning method.

Note that in the present embodiments, descriptions have been provided based on an assumption that the number of the nozzles of an ink-jet head is 128; however the present invention is not limited to this. In addition, in order to simplify the description, the present invention has been divided into each of the above embodiments; however, the present invention naturally includes the case where each of the configuration described in the above embodiments is combined as appropriate.

The present invention is not limited to the above embodiments and various changes and modifications can be made within the spirit and scope of the present invention. Therefore, to appraise the public of the scope of the present invention, the following claims are made.

What is claimed is:

1. A printing apparatus for printing an image on a printing medium by scanning a printhead having a plurality of printing elements, comprising:

mask means for generating print image data by performing masking of image data corresponding to a band width of the image for each of a plurality of number of times of scanning when the band width of the image is to be printed on an area of the printing medium by scanning the printhead the plurality of number of times over the area;

a memory for storing correction data for correcting the print image data in accordance with the number of times of scanning;

correction means for correcting the print image data in accordance with the correction data stored in said memory, when printing is performed by scanning the printhead for the plurality of number of times; and print means for performing a printing operation by driving the printhead in accordance with the print image data corrected by said correction means.

2. A printing apparatus for printing an image on a printing medium by scanning a printhead having a plurality of printing elements, comprising:

a memory for storing correction data for correcting print image data in accordance with a type of the printing medium;

mask means for generating print image data by performing masking of image data corresponding to a band width of the image for each of a plurality of number of times of scanning when the band width of the image is to be printed on an area of the printing medium by scanning the printhead the plurality of number of times over the area;

correction means for correcting the print image data in accordance with the correction data stored in said memory, when printing is performed by scanning the printhead for the plurality of number of times; and print means for performing a printing operation by driving the printhead in accordance with the print image data corrected by said correction means.

3. A printing system including a printing apparatus which prints an image on a printing medium by scanning with a printhead having a plurality of printing elements, said printing apparatus comprising:

first print means for printing a predetermined width of an image by scanning the printhead once over an area of the printing medium;

second print means for printing the predetermined width of the image by scanning the printhead a plurality of number of times over the area;

correction data obtain means for printing tone data on the printing medium by utilizing said first and second print means, reading the printing medium on which the tone data has been printed and obtaining correction data corresponding to the printing medium; and correction means for correcting image data corresponding to the predetermined width of the image in accordance with a type of the printing medium to be used for printing and the correction data obtained by said correction data obtain means, at the time of printing by said second print means.

4. A printing system including a printing apparatus which prints an image on a printing medium by scanning of a printhead having a plurality of printing elements, said printing apparatus comprising:

first print means for printing a predetermined width of an image by scanning the printhead once over an area of the printing medium;

second print means for printing the predetermined width of the image by scanning the printhead a plurality of number of times over the area;

correction data obtain means for printing tone data on the printing medium by utilizing said first and second print means, reading the printing medium on which the tone data has been printed and obtaining correction data corresponding to the plurality of number of times of scanning by said second print means; and correction means for correcting image data corresponding to the predetermined width of the image in accordance with the number of times of scanning and the correction data obtained by said correction data obtain means, at the time of printing by said second print means.

5. A printing method of printing an image on a printing medium by scanning a printhead having a plurality of printing elements, comprising the steps of:

when a printing band width of an image is to be printed by scanning the printhead a plurality of number of times over an area of the printing medium, generating print image data by Performing masking of image data corresponding to the printing band width of the image for each of the plurality of number of times of scanning;

correcting the print image data in accordance with correction data in a memory which stores the correction data for correcting the print image data in accordance with the number of times of scanning, when printing is performed by scanning for the plurality of number of times; and performing a printing operation by driving the printhead in accordance with the corrected image data.

6. A printing method of printing an image on a printing medium by scanning a printhead having a plurality of printing elements, comprising the steps of:

when a printing band width of an image is to be printed by scanning the printhead a plurality of number of times over an area of the printing medium, generating print image data by performing masking of image data corresponding to the printing band width of the image for each of the plurality of number of times of scanning;

correcting the print image data in accordance with correction data in a memory which stores the correction data for correcting the print image data in accordance with a type of a printing medium, when printing is performed by scanning for the plurality of number of times; and performing a printing operation by driving the printhead in accordance with the corrected print image data.

* * * * *

UNITED STATES PATENT AND TRADEMARK OFFICE
CERTIFICATE OF CORRECTION

PATENT NO. : 6,174,043 B1
DATED : January 16, 2001
INVENTOR(S) : Nobuhiko Ogata

It is certified that error appears in the above-identified patent and that said Letters Patent is hereby corrected as shown below:

Title page,
Item [56], References Cited, FOREIGN PATENT DOCUMENTS, "517543 12/1992 (EP)."; "526205 2/1993 (EP)."; "532302 3/1993 (EP)."; "597714 5/1994 (EP)."; "606022 7/1994 (EP)."; and "645246 3/1995 (EP)." should be deleted.
"04028553" should read -- 4-028553 --
"05031919" should read -- 5-031919 --.

Item [57], ABSTRACT,
Line 5, "operation," should read -- operations, --.

Column 2,
Line 47, "X4," should read -- X-4, --; and
Line 48, "Y4" should read -- Y-4 --.

Column 3,
Line 3, "singles-canning" should read -- single-scanning --.

Column 4,
Line 64, "an" should read -- and a --.

Column 6,
Line 3, "tion" should read -- tions --.

Column 7,
Line 66, "inverse" should read -- inverted --.

Column 8,
Line 6, "20" should read -- 20 V"; and
Line 7, "V" should be deleted.

Column 9,
Line 25, "apt" should read -- are apt --.

Column 12,
Line 22, "so-called an" should read -- a so-called --; and
Line 61, "full line" should read -- full-line --.

UNITED STATES PATENT AND TRADEMARK OFFICE
CERTIFICATE OF CORRECTION

PATENT NO.    : 6,174,043 B1
DATED         : January 16, 2001
INVENTOR(S)   : Nobuhiko Ogata It is certified that error appears in the above-identified patent and that said Letters Patent is hereby corrected as shown below:

Column 13,
Line 67, "however" should read -- however, --.

Column 14,
Line 5, "configuration" should read -- configurations -- and "is" should read -- are --; and
Line 10, "appraise" should read -- apprise --

Column 16,
Line 4, "Performing" should read -- performing --

Signed and Sealed this

Ninth Day of April, 2002

*Attest:*

*Attesting Officer*

JAMES E. ROGAN
*Director of the United States Patent and Trademark Office*